US011308624B2

(12) United States Patent
Kono et al.

(10) Patent No.: US 11,308,624 B2
(45) Date of Patent: Apr. 19, 2022

(54) ADHERED SUBSTANCE DETECTION APPARATUS

(71) Applicant: DENSO TEN Limited, Kobe (JP)

(72) Inventors: Takashi Kono, Kobe (JP); Nobunori Asayama, Kobe (JP); Nobuhisa Ikeda, Kobe (JP); Yasushi Tani, Kobe (JP); Daisuke Yamamoto, Kobe (JP); Daisuke Shiota, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 73 days.

(21) Appl. No.: 17/019,755

(22) Filed: Sep. 14, 2020

(65) Prior Publication Data

US 2021/0090262 A1 Mar. 25, 2021

(30) Foreign Application Priority Data

Sep. 20, 2019 (JP) .............................. JP2019-172205

(51) Int. Cl.
*G06T 7/11* (2017.01)
*G06T 7/12* (2017.01)
(Continued)

(52) U.S. Cl.
CPC ................. *G06T 7/12* (2017.01); *G06T 7/11* (2017.01); *G06T 7/194* (2017.01); *G06T 2207/30252* (2013.01)

(58) Field of Classification Search
CPC ... G06T 7/11; G06T 7/12; G06T 7/136; G06T 7/194; G06T 2207/30252; G06T 2207/30264
See application file for complete search history.

(56) References Cited

U.S. PATENT DOCUMENTS

2007/0285522 A1\* 12/2007 Kimura ................ H04N 5/2328
348/208.99
2011/0080494 A1\* 4/2011 Mori .................. H04N 5/22521
348/222.1
(Continued)

FOREIGN PATENT DOCUMENTS

JP 2002094978 A \* 3/2002
JP 2019-106644 A 6/2019

OTHER PUBLICATIONS

Sindhu et al. ("Detection of mud on camera lens for advance driver assistance system," International Conference on Intelligent Computing and Control; Date of Conference: Jun. 23-24, 2017) (Year: 2017).\*

*Primary Examiner* — Yubin Hung
(74) *Attorney, Agent, or Firm* — Oliff PLC

(57) ABSTRACT

An adhered substance detection apparatus determines whether a substance is adhered to an image-capturing apparatus. The adhered substance detection apparatus includes a controller configured to function as: an extractor that extracts candidate regions for being an adhered substance region in which the substance is adhered to the image-capturing apparatus, the candidate regions being extracted based on an edge that is detected from pixels in an image captured by the image-capturing apparatus; and a final determiner that finally determines whether the candidate regions are the adhered substance region, based on i) an area of the candidate region located in a first region of the captured image, the first region including a road surface region in the captured image and ii) an area of the candidate region located in a second region of the captured image, the second region including a region other than the road surface region in the captured image.

6 Claims, 14 Drawing Sheets

(51) Int. Cl.
   *G06T 7/136*       (2017.01)
   *G06T 7/194*       (2017.01)

(56)         References Cited

U.S. PATENT DOCUMENTS

2014/0147007  A1*  5/2014  Hayakawa ............. G08G 1/167
                                                      382/103
2015/0206305  A1*  7/2015  Parakrama ......... G06K 9/00791
                                                      382/172
2017/0126964  A1*  5/2017  Fukui ................. H04N 5/23238
2017/0193641  A1*  7/2017  Cheng ................ G06K 9/00791
2019/0135239  A1*  5/2019  Rice .......................... B05B 1/08
2020/0084356  A1*  3/2020  Tsurube ............. H04N 5/22521
2020/0151466  A1*  5/2020  Kokubo ................... G06K 9/40

* cited by examiner

ADHERED SUBSTANCE DETECTION APPARATUS

BACKGROUND OF THE INVENTION

Field of the Invention

The invention relates to an adhered substance detection apparatus and an adhered substance detection method.

Description of the Background Art

Conventionally, there has been known an adhered substance detection apparatus that detects a candidate region that has a feature similar to a form of a raindrop and the like, based on an edge detected from each pixel in a captured image captured by a camera, and then detects an adhered substance region based on a pixel value of the candidate region.

However, as to the conventional technology, accuracy in detecting an adhered substance needs to be improved. For example, a shape of reflection of light reflected from a road surface under a light provided to a roofed area is similar to a shape of a raindrop in a captured image so that there is a possibility that the light reflection may be incorrectly detected as an adhered substance in the conventional technology.

SUMMARY OF THE INVENTION

According to one aspect of the invention, an adhered substance detection apparatus that determines whether a substance is adhered to an image-capturing apparatus includes a controller configured to function as: an extractor that extracts candidate regions for being an adhered substance region in which the substance is adhered to the image-capturing apparatus, the candidate regions being extracted based on an edge that is detected from pixels in a captured image captured by the image-capturing apparatus; and a final determiner that finally determines whether the candidate regions are the adhered substance region, based on, among the candidate regions extracted by the extractor, i) an area of the candidate region located in a first region of the captured image, the first region including a road surface region in the captured image and ii) an area of the candidate region located in a second region of the captured image, the second region including a region other than the road surface region in the captured image.

Thus, an object of the invention is to provide an adhered substance detection apparatus and an adhered substance detection method to accurately detect an adhered substance.

These and other objects, features, aspects and advantages of the invention will become more apparent from the following detailed description of the invention when taken in conjunction with the accompanying drawings.

DESCRIPTION OF THE EMBODIMENTS

An adhered substance detection apparatus and an adhered substance detection method of an embodiment will be described with reference to the attached drawings. The present invention will not be limited by the embodiment described below.

Figure 1:
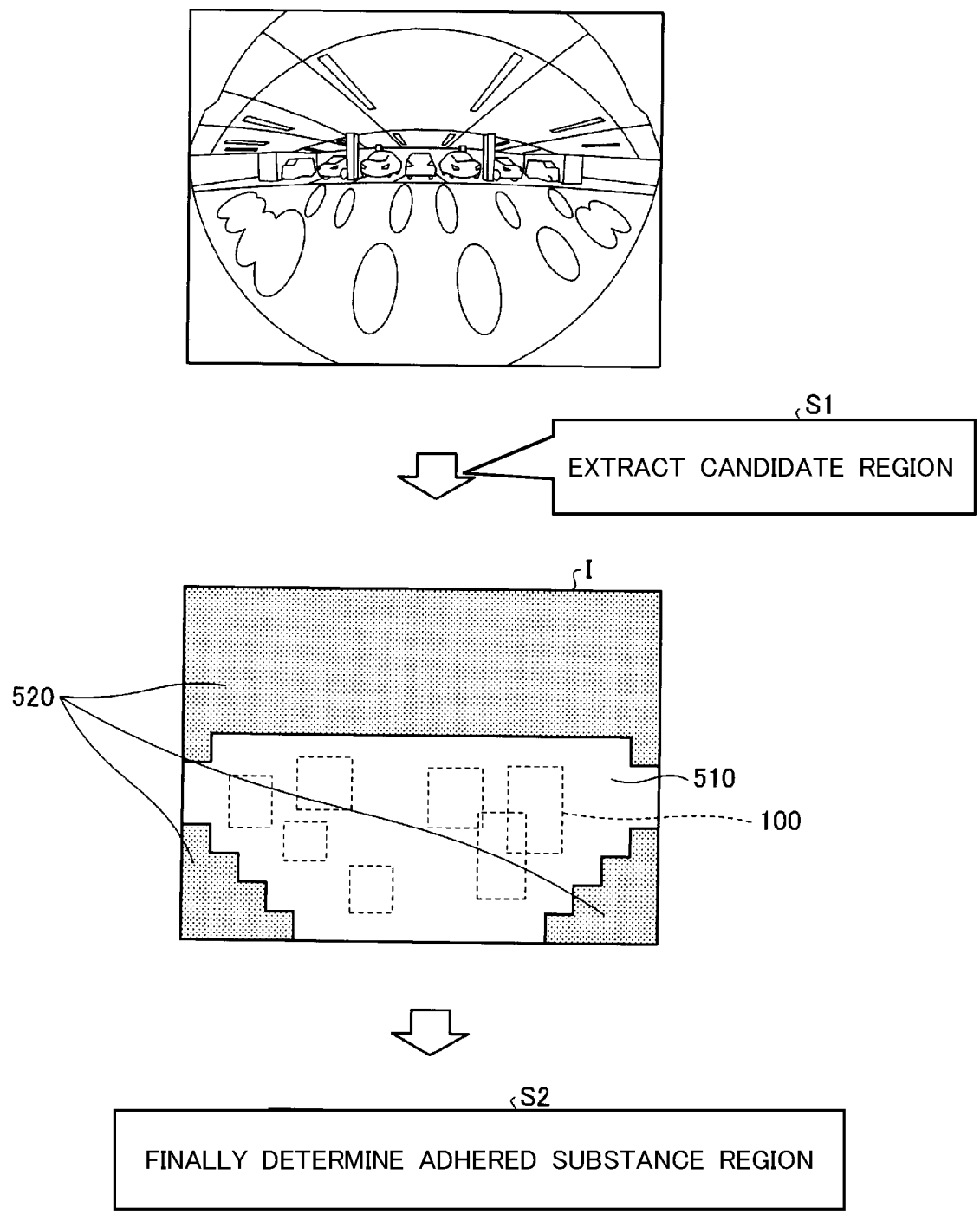
FIG. 1 illustrates an outline of an adhered substance detection method of an embodiment.

First, an outline of the adhered substance detection method of this embodiment will be described with reference to FIG. 1. FIG. 1 illustrates the outline of the adhered substance detection method of this embodiment. FIG. 1 shows a captured image I that is captured by a vehicle-mounted camera (an example of an image-capturing device), for example, under lighting equipment provided to a roofed area, such as a roofed parking lot, a roofed garage, etc.

Light of the lighting equipment provided to the roofed area is reflected from a road surface or a floor surface (hereinafter collectively "road surface") under the lighting equipment so that the captured image I as shown in FIG. 1 includes substantially oblong and unclear regions of the light reflection. In other words, in the captured image I, the light reflection appears similar to a region in which a substance is adhered to a lens of the camera (hereinafter, "adhered substance region"). In other words, a region in which the light of the light equipment is reflected from the road surface has a similar luminance feature to a luminance feature of the adhered substance region. The adhered substance may be any substance, such as mud, dust, a raindrop, snow, etc. of which a region in the captured image I is unclear.

Conventionally, there has been a possibility of incorrect detection of such light reflection from the road surface in the captured image as the adhered substance region because the adhered substance region has been detected based on luminance information of the captured image.

In order to accurately discriminate the region of the light reflection from the road surface (hereinafter "road surface reflection) from the adhered substance region, an adhered substance detection apparatus 1 (see FIG. 2) of this embodiment uses a characteristic that the region of the light reflection from the road surface often appears or is concentrated on a region of the road in the captured image I.

More specifically, in the adhered substance detection method of this embodiment, a candidate region 100 is extracted based on an edge that is detected from each pixel in the captured image I. The candidate region 100 is a candidate for being the adhered substance region in which the adhered substance is adhered to the lens of the camera (a step S1). FIG. 1 illustrates an example in which the region of the road surface reflection is incorrectly extracted as the candidate region 100.

The adhered substance detection method of this embodiment extracts, as the candidate region 100, a rectangular region including a circular-shaped outline, such as a raindrop, for example, by a matching processing, such as a pattern matching.

Next, in the adhered substance detection method of this embodiment, the adhered substance region is finally determined based on i) an area of the extracted candidate region 100 located in a first region including a road surface region 510 in the captured image I and ii) an area of the extracted candidate region 100 located in a second region including a region 520 other than the road surface region 510 (a step S2).

For example, when the area of the candidate region 100 located in the first region including the road surface region 510 is greater, by at least a predetermined value, than the area of the candidate region 100 located in the second region including the region 520 other than the road surface region 510, the adhered substance detection method of this embodiment finally determines the candidate region 100 other than the candidate region 100 located in the first region, to be the adhered substance region.

In other words, when the candidate region 100 is concentrated in the road surface region 510, as shown in the captured image I in FIG. 1, the candidate region 100 existing in the road surface region 510 is finally determined not to be the adhered substance region in the adhered substance detection method. Therefore, it is possible to prevent the region of the road surface reflection from being incorrectly detected as the adhered substance region. Thus, according to the adhered substance detection method of this embodiment, it is possible to accurately detect the adhered substance.

In the foregoing description, the adhered substance region is finally determined based on whether the area of the candidate region 100 located in the first region including the road surface region 510 is greater than the area of the candidate region 100 located in the second region including the region 520 other than the road surface region 510 by at least the predetermined value. However, any area comparison method may be used to determine whether the candidate region 100 is intensively located in the first region.

For example, the adhered substance region may be finally determined by detecting that the area of the candidate region 100 located in the second region is extremely small relative to an entire area of the candidate region 100.

Figure 2:
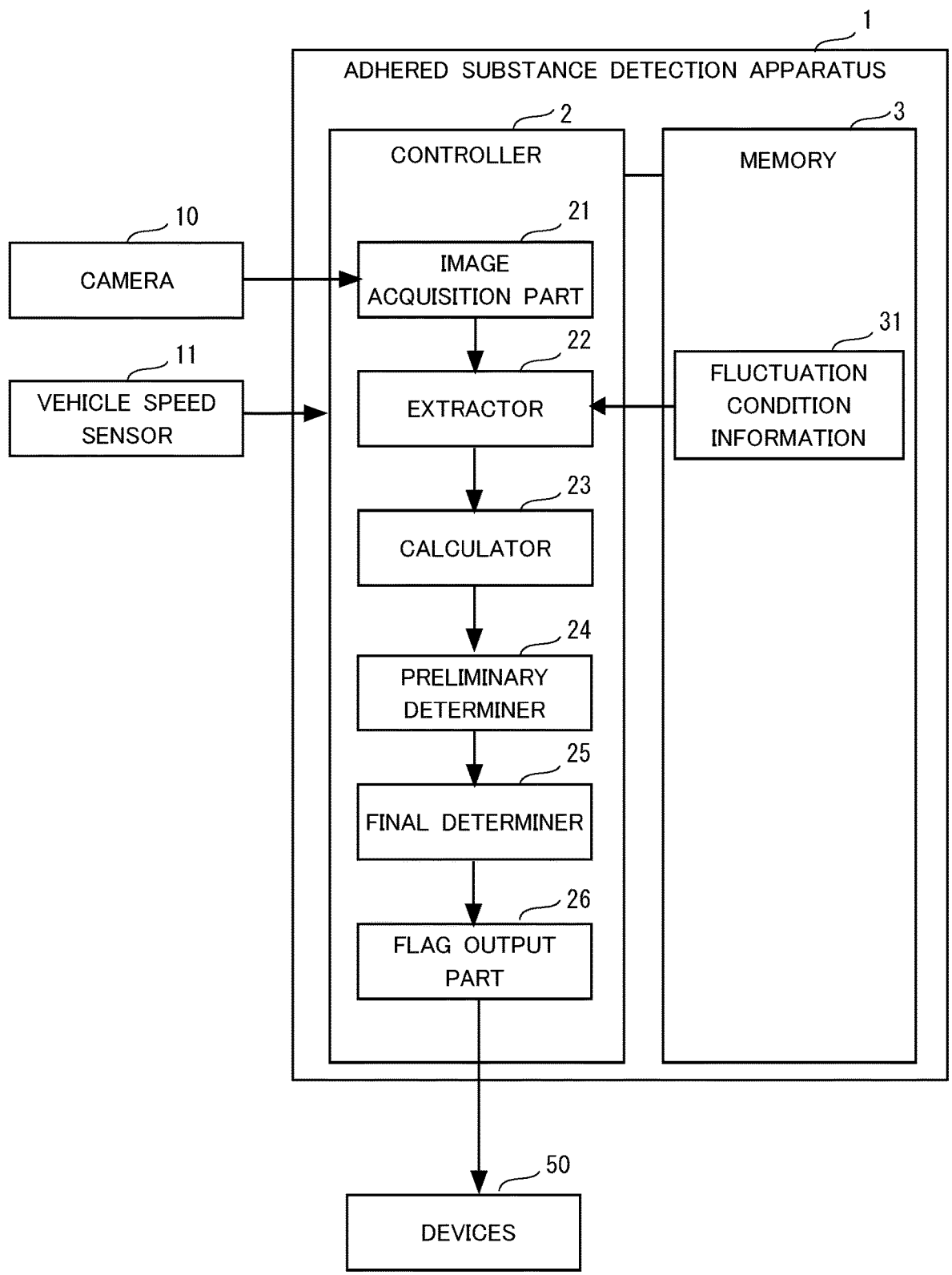
FIG. 2 is a block diagram illustrating a configuration of an adhered substance detection apparatus of the embodiment.

Next, a configuration of the adhered substance detection apparatus 1 of this embodiment will be described with reference to FIG. 2. FIG. 2 is a block diagram illustrating the configuration of the adhered substance detection apparatus 1 of this embodiment. As shown in FIG. 2, the adhered substance detection apparatus 1 of this embodiment is connected to a camera 10, a vehicle speed sensor 11, and various devices 50. In FIG. 2, the adhered substance detection apparatus 1 is configured to be separated from the camera 10 and the various devices 50. However, a configuration of the adhered substance detection apparatus 1 is not limited to the configuration in FIG. 2. The adhered substance detection apparatus 1 may be configured as one unit with, at least one of the camera 10 and the various devices 50.

The camera 10 is a vehicle-mounted camera that includes, for example, a lens, such as a fisheye lens, and an image-capturing sensor, such as a charge coupled device (CCD) and a complementary metal oxide semiconductor (CMOS). The camera 10 is installed in each of positions capable of capturing images showing, for example, front, rear and side areas of the vehicle. The camera 10 outputs the captured image I to the adhered substance detection apparatus 1.

The vehicle speed sensor 11 detects a speed of a vehicle (vehicle speed). The vehicle speed sensor 11 outputs information of the detected vehicle speed to the adhered substance detection apparatus 1. The vehicle speed sensor 11 may be omitted. In that case, the information of the vehicle speed may be calculated, for example, based on time-series images captured by the camera 10.

The devices 50 acquire a detection result detected by the adhered substance detection apparatus 1 to perform various controls for the vehicle. Some among the devices 50 are: a display apparatus that informs a user of the adhered substance adhered on the lens of the camera 10 and of a message that the adhered substance needs to be removed; a removal apparatus that removes the adhered substance by ejecting fluid, air, or the like, toward the lens of the camera 10; and a vehicle control apparatus that controls autonomous driving of the vehicle; etc.

As shown in FIG. 2, the adhered substance detection apparatus 1 of this embodiment includes a controller 2 and a memory 3. The controller 2 includes an image acquisition part 21, an extractor 22, a calculator 23, a preliminary determiner 24, a final determiner 25, and a flag output part 26. The memory 3 stores fluctuation (up and down) condition information 31.

The adhered substance detection apparatus 1 includes, for example, a computer and various circuits that include a central processing unit (CPU), a read only memory (ROM), a random access memory (RAM), a data flash, an in/out port, etc.

The CPU of the computer reads out and executes, for example, a program stored in the ROM so as to function as the image acquisition part 21, the extractor 22, the calculator 23, the preliminary determiner 24, the final determiner 25, and the flag output part 26 of the controller 2.

Moreover, at least one or all of the image acquisition part 21, the extractor 22, the calculator 23, the preliminary determiner 24, the final determiner 25, and the flag output part 26 of the controller 2 may be configured by hardware, such as an application specific integrated circuit (ASIC) and field programmable gate array (FPGA).

The memory 3 is, for example, a RAM or a data flash memory. The RAM or the data flash memory stores the fluctuation condition information 31, information of programs, etc. The adhered substance detection apparatus 1 may acquire the foregoing programs and information from a portable memory or another computer connected to the adhered substance detection apparatus 1 via a wireless or wired network.

The fluctuation condition information 31 stored in the memory 3 is information including a condition serving as a criterion for a process, described later, performed by the extractor 22. An example of the information is a pattern condition for a fluctuation of luminance distribution (average luminance distribution). The pattern condition includes a fluctuation pattern of the average luminance distribution, i.e., a threshold range for a change amount of the fluctuation. A process that uses the fluctuation condition information 31 will be described later.

The image acquisition part 21 acquires the image captured by the camera 10 to generate (acquire) a current frame that is the current captured image I. More specifically, the image acquisition part 21 performs grayscale processing that converts luminance of each pixel in the acquired captured image into gray level from white to black based on the luminance in each pixel in the captured image.

The image acquisition part 21 performs a pixel thinning process for the acquired captured image to generate an image having a reduced size as compared to the acquired captured image. The image acquisition part 21 generates, as the current frame, an integral image from a value of each pixel and an integral image from a square value of each pixel of the thinned captured image. The value of each pixel is luminance and/or edge information of the pixel.

As a result, since the adhered substance detection apparatus 1 performs the thinning process of the acquired captured images, and generates the integral images, the adhered substance detection apparatus 1 speeds up calculation in a later process so that the adhered substance detection apparatus 1 can detect the adhered substance in a shorter processing time period.

The image acquisition part 21 may perform a smoothing process of each pixel, using a smoothing filter, such as an averaging filter. Further, the image acquisition part 21 may generate the current frame having a same size as a size of the acquired captured image, without performing the thinning process. The current frame will be below described also as the captured image I.

The extractor 22 extracts, based on the edge detected from each pixel in the captured image I acquired by the image acquisition part 21, the candidate region 100 for being the adhered substance region from the captured image I. More specifically, the extractor 22 first extracts the luminance and the edge information of each pixel in the captured image I. The luminance of each pixel is expressed by, for example, a parameter from 0 to 255.

The extractor 22 performs an edge detection process based on the luminance of each pixel to detect an edge in an X-axis direction (a horizontal direction of the captured image I) and an edge in a Y-axis direction (a vertical direction of the captured image I) of each pixel. Any edge detection filter, for example, a sobel filter or a prewitt filter, may be used for the edge detection process.

The extractor 22 detects, as the edge information, a vector that includes information of an edge angle and an edge strength of each pixel, using trigonometric function based on the edge in the X-axis direction and the edge in the Y-axis direction. More specifically, the edge angle is expressed by a direction of the vector, and the edge strength is expressed by a length of the vector.

The extractor 22 performs the matching processing (template matching) that matches the detected edge information with preliminarily prepared template information that shows an outline of an adhered substance, to extract the edge information similar to the template information. Then, the extractor 22 extracts a region corresponding to the extracted edge information, i.e., the extractor 22 extracts the rectangular candidate region 100 including the outline of the adhered substance.

The extractor 22 may output, to the calculator 23, the information of the candidate region 100 extracted by the matching processing, or may output, to the calculator 23, information of the candidate region 100 further narrowed by an extraction processing described below.

The extractor 22 divides a plurality of continuous (continuously aligned) pixel lines in the extracted candidate region 100 into unit regions R by a predetermined number of the pixels. Then, the extractor 22 calculates an average luminance value and a luminance standard deviation for each of the unit regions R With reference to FIGS. 3A to 4B, a process that is performed by the extractor 22 will be described here. FIGS. 3A to 4B illustrate the process that is performed by the extractor 22.

Figure 3A:
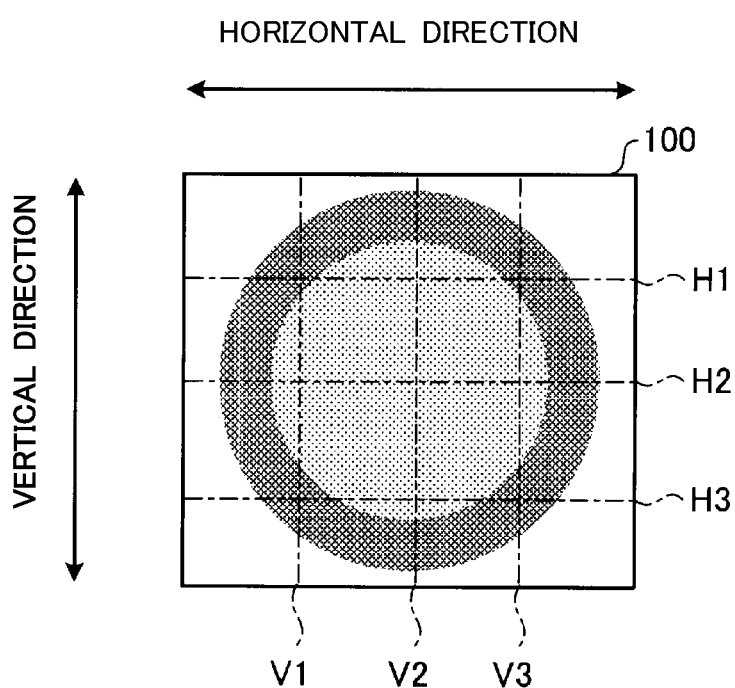
FIG. 3A illustrates a process that is performed by an extractor.
Figure 3B:
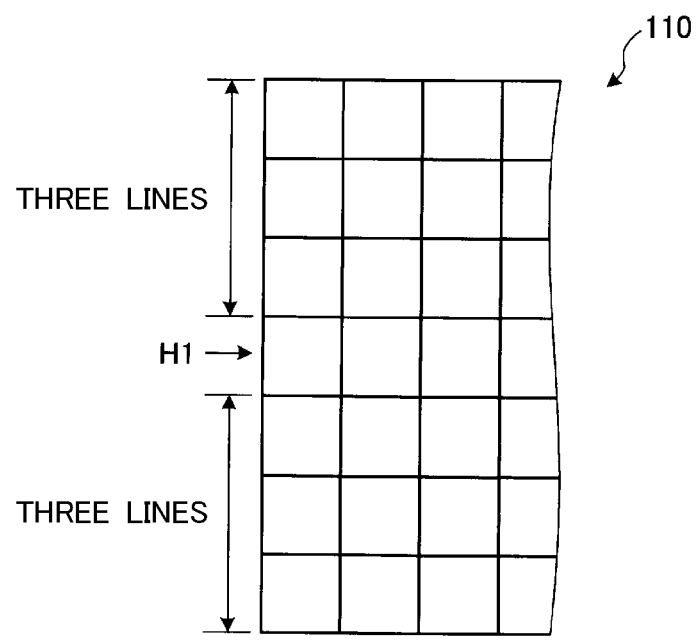
FIG. 3B illustrates the process that is performed by the extractor.

As shown in FIGS. 3A and 3B, the extractor 22 first sets the plurality of continuous pixel lines in the candidate region 100, as a belt region 110. The belt region 110 is a target region of a division process and a calculation process of the luminance information (average value and standard deviation), described later, for each of the unit regions R.

More specifically, as shown in FIG. 3A, the extractor 22 first selects three pixel lines H1, H2, and H3 in the horizontal direction and three pixel lines V1, V2, and V3 in the vertical direction. Then, as to each of the selected pixel lines, the extractor 22 sets, as the belt region 110, the plurality of pixel lines including the selected pixel line.

FIG. 3B illustrates the belt region 110 that includes the pixel line H1 in the horizontal direction. A setting method of the belt region 110 that includes each of the pixel lines V1, V2 and V3 in the vertical direction is omitted because the setting method is substantially same as a setting method of the belt region 110 that includes the pixel line H1 in the horizontal direction described below (difference is only the direction, horizontal or vertical, of the pixel lines).

As shown in FIG. 3B, the extractor 22 sets, as the belt region 110, the plurality of pixel lines that are continuously aligned in the vertical direction, centering on the selected pixel line H1. In other words, the extractor 22 sets, as the belt region 110, the plurality of pixel lines parallel to the selected pixel line H1 and adjacent to one another.

In FIG. 3B, the extractor 22 sets, as the belt region 110 for the selected pixel line H1, seven pixel lines including the pixel line H1 extending in the horizontal direction and the three vertically-continuous pixel lines each above and below (six pixel lines in total) the pixel line H1.

A position of the pixel line H1 in the belt region 110 is not limited to a center of the belt region 110. The position of the pixel line H1 may be upper or lower than the center of the belt region 110 in the vertical direction. Further, number of the vertically-continuous pixel lines above and below the pixel line H1 may be two or less or four or more.

In this embodiment, the pixel lines H1 to H3 and V1 to V3 are selected. However, either the pixel lines H1 to H3 in the horizontal direction or the pixel lines V1 to V3 in the vertical direction may be selected. Further, number of the selected pixel lines H1 to H3 in the horizontal direction and/or the selected pixel lines V1 to V3 in the vertical direction may not be limited to three, but may be two or less or four or more.

Figure 4A:
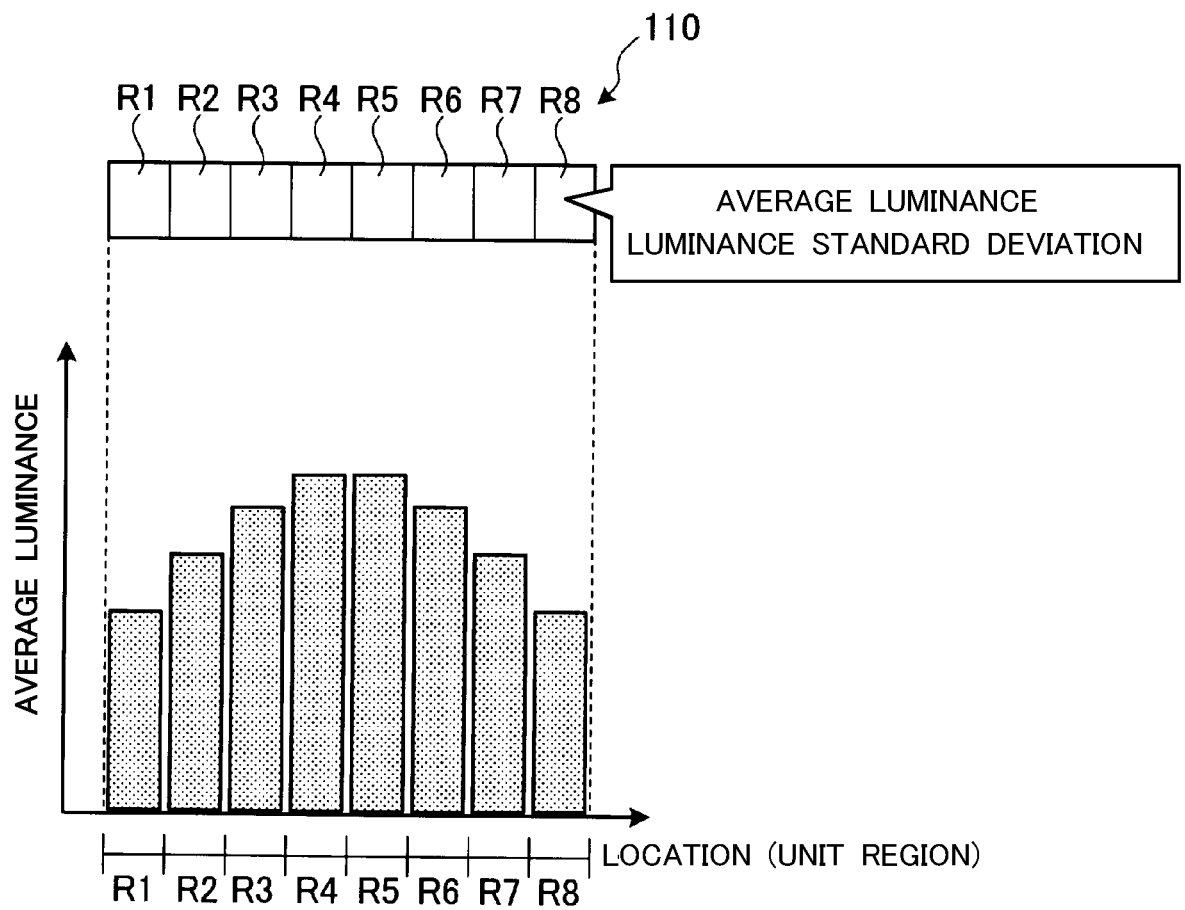
FIG. 4A illustrates the process that is performed by the extractor.

Next, as shown in FIG. 4A, the extractor 22 divides the set belt region 110 into unit regions R1 to R8 by a predetermined number of the pixels, and calculates the average luminance value and the luminance standard deviation for each of the unit regions R1 to R8.

In an example shown in FIG. 4A, the extractor 22 divides the belt region 110 by an equal interval (same number of the pixels) to set the eight unit regions R1 to R8. However, number of the unit regions R may be seven or smaller or nine or greater. Number of the pixels included in each of the unit regions R may be same or different.

Then, when the calculated luminance standard deviation of the unit region R in the belt region 110 is smaller than a predetermined value, the extractor 22 sets the average luminance value as a representative value of the unit region R.

Figure 4B:
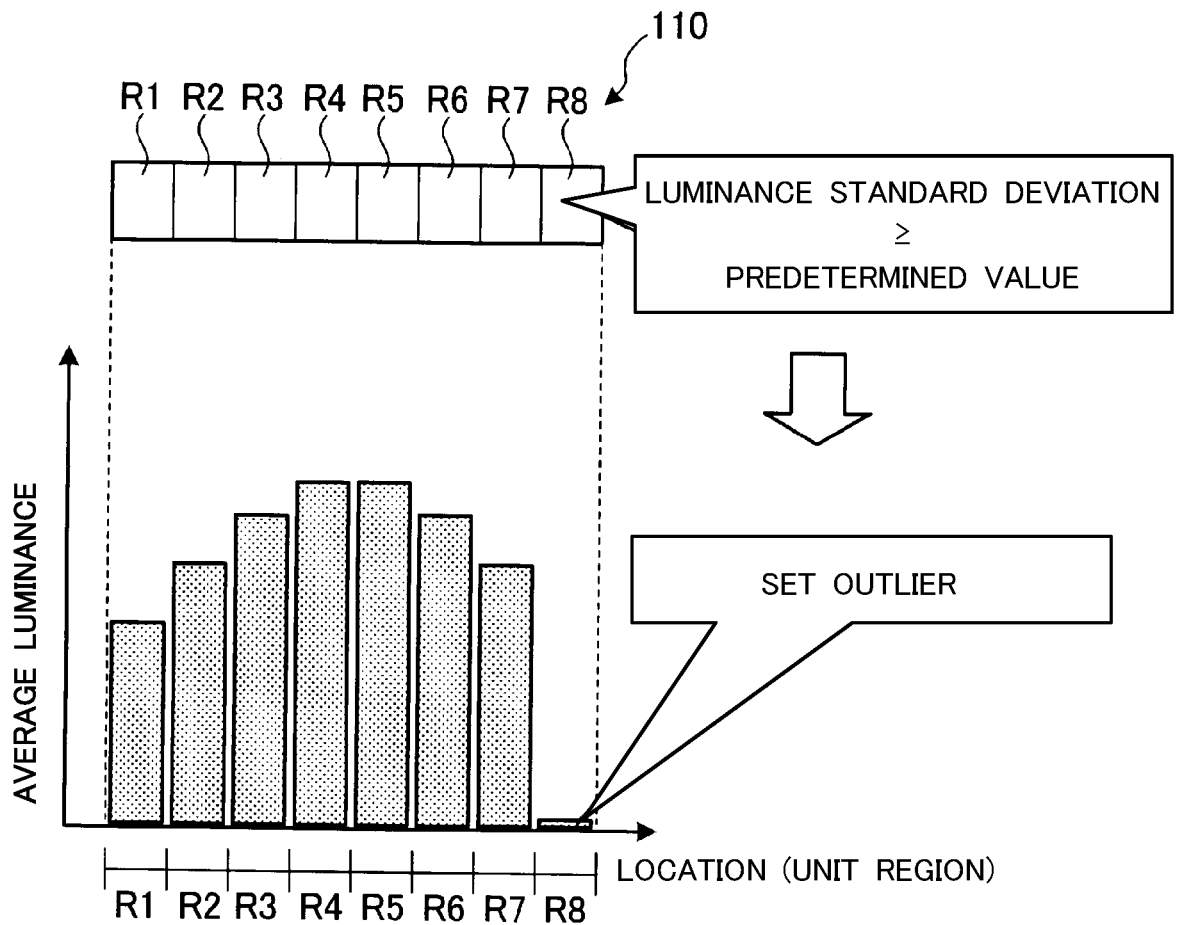
FIG. 4B illustrates the process that is performed by the extractor.

On the other hand, as shown in FIG. 4B, when the calculated luminance standard deviation of the unit region R among the unit regions R1 to R8 in the belt region 110 is equal to or greater than the predetermined value, the extractor 22 sets a predetermined outlier as the representative value of the unit region R, instead of the average luminance of the unit region R, for the average luminance distribution of the belt region 110.

In an example shown in FIG. 4B, when the luminance standard deviation of the unit region R8 is equal to or greater than the predetermined value, the calculator 23 sets the predetermined outlier (e.g., a minimum value, zero, etc.), instead of the average luminance value of the unit region R8, as the representative value of the unit region R8.

The outlier is a value to determine that a region is not the adhered substance region in a later process. For example, in a case where the extractor 22 determines the adhered substance region in the later process based on whether or not the average luminance distribution matches a predetermined pattern, the calculator 23 sets the outlier that does not match the predetermined pattern.

Thus, since the extractor 22 sets the outlier not to be determined to be the adhered substance region in the later process, the candidate region 100 that is not the adhered substance region can be excluded without adding another process so that the process of determining the adhered substance region can be less complicated.

The extractor 22 uses the average luminance value as the representative value of the unit region R. However, for example, the extractor 22 may generate a histogram of luminance for each of the unit regions R1 to R8, and may set a mode value, a median value, an average value, etc. of the histogram, as the representative value.

Then, the extractor 22 further narrows the candidate region 100 based on the calculated average luminance distribution for each of the unit regions R.

More specifically, first, when a fluctuation of the luminance distribution (the average luminance distribution) of the pixels included in the candidate region 100 satisfies a predetermined exclusion condition, the extractor 22 excludes the candidate region 100 from an adhered substance region determination process.

Figure 5:
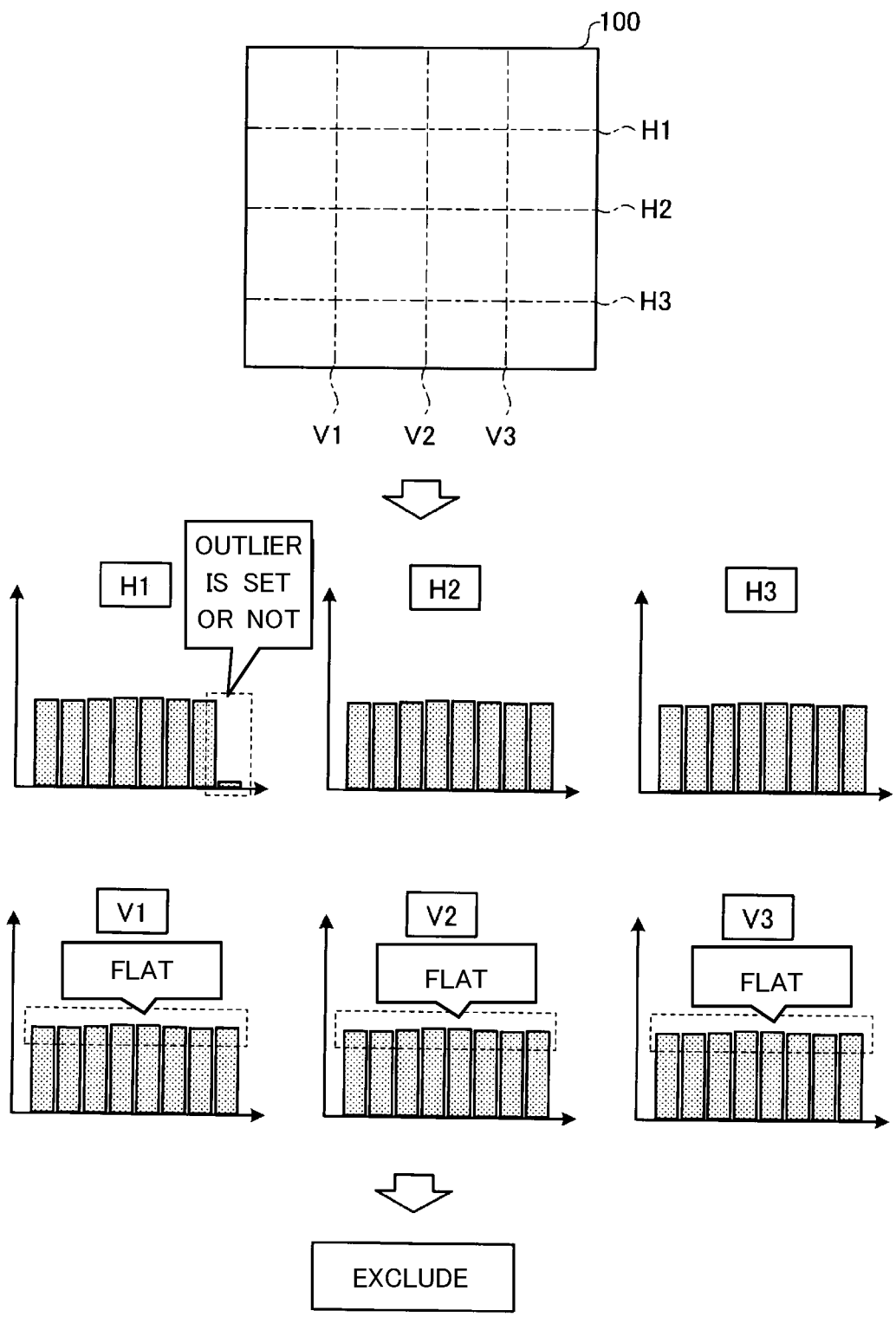
FIG. 5 illustrates an exclusion process that is performed by the extractor.

Here, an exclusion process of the candidate region 100 that is performed by the extractor 22 will be described with reference to FIG. 5. FIG. 5 illustrates the exclusion process that is performed by the extractor 22. FIG. 5 shows the average luminance distribution of each belt region 110 calculated from a predetermined candidate region 100. FIG. 5 shows the average luminance distribution for each of the belt regions 110 corresponding to the pixel lines H1 to H3 and V1 to V3 set in the candidate region 100. For example, a graph "H1" in FIG. 5 shows the average luminance distribution of the unit regions R in the belt region 110 including the pixel line H1.

When the fluctuation of the average luminance distribution for each of the belt regions 110 corresponding to the pixel lines H1 to H3 and V1 to V3 satisfies the predetermined exclusion condition, the extractor 22 excludes the candidate region 100 from the adhered substance region determination process.

For example, when the outlier is included in the representative values of the unit regions R included in the belt region 110, the extractor 22 excludes the candidate region 100 from the adhered substance region determination process. In other words, when a difference in representative values of two unit regions R adjacent to each other in the belt region 110 is equal to or greater than the predetermined value, the extractor 22 excludes the candidate region 100 from the adhered substance region determination process.

Further, in other words, when the belt region 110 includes one or more unit regions R of which the standard deviation of the representative value is equal to or greater than a predetermined value (i.e., the unit region R for which the outlier was set), the extractor 22 excludes the candidate region 100 from the adhered substance region determination process.

In other words, when a portion of the fluctuation of the average luminance distribution abruptly ups or downs due to the outlier, the extractor 22 determines that the candidate region 100 satisfies the exclusion condition and excludes the candidate region 100 from the adhered substance region determination process. Thus, since the extractor 22 performs the exclusion process based on the outlier, the extractor 22 accurately excludes a region that is not the adhered substance region.

Further, as shown by graphs of the pixel lines V1 to V3 in FIG. 5, when, the fluctuations of the average luminance distributions are flat in all the three graphs, i.e., when the fluctuations of the average luminance of all the three belt regions 110 corresponding to the pixel lines V1 to V3 in the vertical direction are within a predetermined range, the extractor 22 excludes the candidate region 100 from the adhered substance region determination process. More specifically, according to an experiment, when the candidate region 100 is a region corresponding to reflection of a backup light from a wall, the average luminance distribution of the unit region R included in the candidate region 100 tends to be flat. Thus, when the fluctuations of the average luminance are within the predetermined range, the extractor 22 determines that the candidate region 100 is caused by reflection of a backup light and excludes from the determination process of an adhered substance region 400.

FIG. 5 shows a case in which the three luminance distributions of the pixel lines V1 to V3 in the vertical direction are flat. When the three luminance distributions of the pixel lines H1 to H3 in the horizontal direction are flat or when the six luminance distributions of the pixel lines H1 to H3 in the horizontal direction and V1 to V3 in the vertical direction are flat, the extractor 22 may exclude the candidate region 100 from the adhered substance region determination process. In other words, when the fluctuations of the luminance distributions of the pixel lines at least in one of the vertical and horizontal directions in the candidate region 100 are within the predetermined range, the extractor 22 determines that the exclusion condition is satisfied and excludes the candidate region 100 from the adhered substance region determination process.

As described above, when the fluctuation of the luminance distribution of the candidate region 100 satisfies the predetermined exclusion condition, the extractor 22 excludes the candidate region 100 from the adhered substance region determination process. Thus, an incorrect determination of the adhered substance region can be reduced. In other words, the adhered substance can be accurately detected.

Next, the extractor 22 performs a process to further narrow the candidate region 100 other than the candidate region 100 excluded based on the exclusion condition. Here, with reference to FIG. 6, the process that is performed by the extractor 22 will be described.

Figure 6:
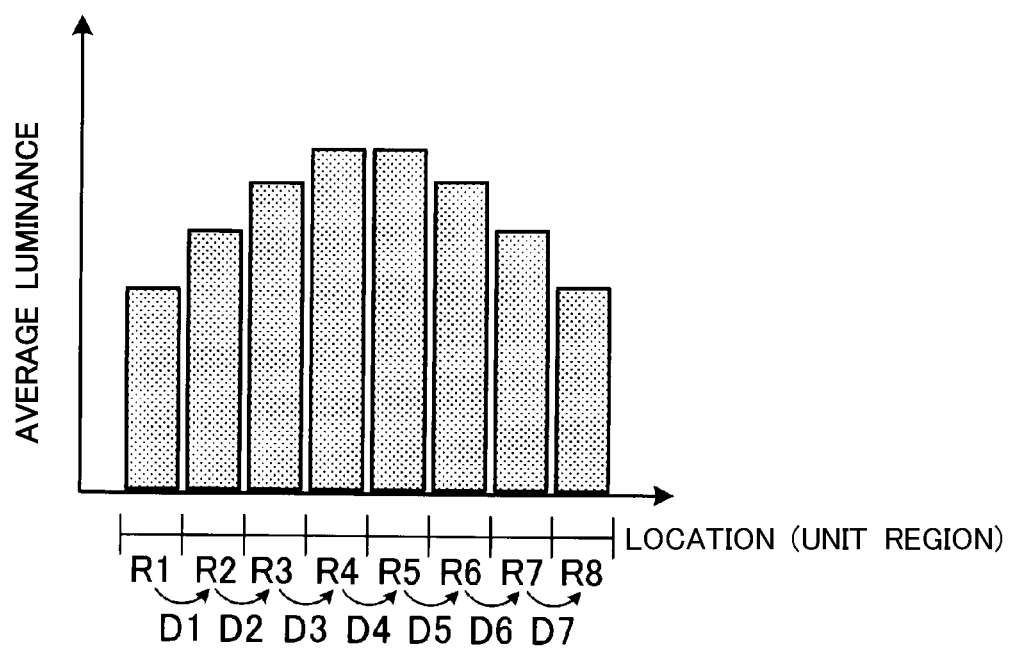
FIG. 6 illustrates a determination process that is performed by the extractor.

FIG. 6 illustrates the determination process that is performed by the extractor 22. First, as shown in FIG. 6, the extractor 22 calculates average luminance change values (hereinafter also referred simply as to "change value(s)") D1 to D7 between two regions adjacent to each other among the unit regions R1 to R8 in each of the belt regions 110.

Then, the extractor 22 extracts the candidate region 100 that includes one or more belt regions 110, out of the plural belt regions 110 in the candidate region 100, in which a fluctuation of the average luminance distributions of the unit region R satisfies a predetermined fluctuation pattern. For example, the extractor 22 compares the change amounts D1 to D7 with values of the fluctuation pattern included in the fluctuation condition information 31 stored in the memory 3 to perform the determination process. The fluctuation pattern included in the fluctuation condition information 31 is a threshold range defined by a maximum value and a minimum value for each of the change amounts D1 to D7.

In other words, the extractor 22 extracts the candidate region 100 of which the calculated change amounts D1 to D7 are within the threshold ranges for the change amounts D1 to D7 in the fluctuation condition information 31.

In other words, the extractor 22 extracts the candidate region 100 in which a pattern of the average luminance change amounts D1 to D7 between two regions adjacent to each other among the unit regions R1 to R8 satisfy the fluctuation pattern that is the threshold ranges set in the fluctuation condition information 31.

Further, the ranges defined by the maximum values and the minimum values are predetermined for the change amounts D1 to D7 in the fluctuation condition information 31 so that the change amounts D1 to D7 are flexible in the ranges. Thus, even when the fluctuation of the luminance distribution varies to some degree, the extractor 22 can extract the candidate region 100.

FIG. 6 shows an example in which the threshold ranges are set for all the change amounts D1 to D7 in the fluctuation condition information 31. However, for example, in order to detect a small-sized adhered substance region, the threshold range may be set only for a portion of the change amounts D1 to D7.

The extractor 22 outputs information of the extracted candidate region 100 to the calculator 23.

The calculator 23 calculates luminance change amounts of plural pixels continuously aligned in a predetermined direction in a predetermined inner region 200 of the candidate region 100 extracted by the extractor 22.

Figure 7:
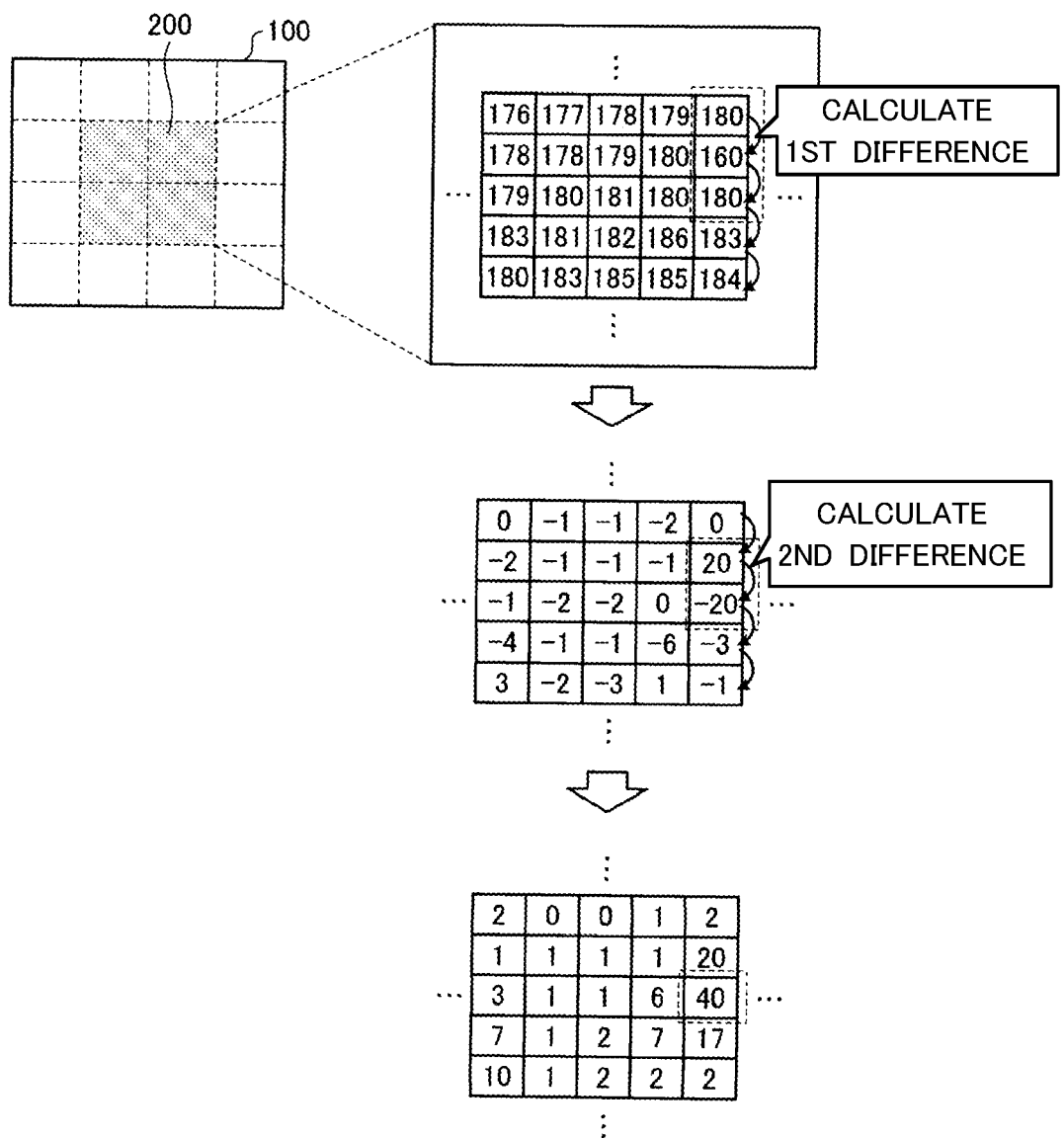
FIG. 7 illustrates a calculation process that is performed by a calculator.

Here, with reference to FIG. 7, next will be described a calculation process that is performed by the calculator 23 to calculate the luminance change amounts of the plural pixels. FIG. 7 illustrates the calculation process that is performed by the calculator 23.

As shown in FIG. 7, the calculator 23 first sets the inner region 200 of the extracted candidate region 100. For example, the calculator 23 divides the candidate region 100 into a predetermined number each in the vertical and horizontal directions. FIG. 7 shows an example in which the candidate region 100 is divided into four each in the vertical and horizontal directions. However, the candidate region 100 may be divided into three or less or five or greater.

Then, the calculator 23 sets, as the inner region 200, a center region of the predetermined number of the divided regions. In FIG. 7, the set inner region 200 is four divided regions that are the center region of 16 divided regions generated by dividing the candidate region 100 into four each in the vertical and horizontal directions.

Then, the calculator 23 calculates the luminance change amounts of the plural pixels in the inner region 200. In FIG. 7, the calculator 23 calculates the luminance changes amount of three pixels continuously aligned in the vertical direction because a region of the road surface reflection often extends in the vertical direction. Thus, the region of the road surface reflection can be accurately determined by the preliminary determiner 24 later. The calculator 23 may calculate luminance change amounts of plural pixels continuously aligned in the horizontal direction.

First, the calculator 23 calculates, as a first difference, a difference between luminance values of two pixels adjacent to each other in the vertical direction. A middle drawing in FIG. 7 illustrates two-dimensionally arranged cells corresponding to an arrangement of the pixels. The first difference is indicated in each of the cells. In other words, in the middle drawing of FIG. 7, a figure in each of the cells shows the first difference that is a difference between the luminance values of the two pixels adjacent to each other in the vertical direction. Two cells adjacent to each other in the vertical direction indicate two first differences calculated from three pixels.

Next, the calculator 23 calculates a second difference that is a difference between two first differences indicated in two cells continuously aligned (adjacent to each other) in the vertical direction. A lower drawing in FIG. 7 illustrates two-dimensionally arranged cells corresponding to the arrangement of the pixels. The second difference converted into an absolute value is indicated in each of the cells. In other words, in the lower drawing of FIG. 7, a figure in each of the cells shows the second difference (luminance change value) calculated from three pixels. In other words, the second difference is a change amount of the first differences.

One of reasons of an abrupt up and down of luminance is a small crack, a small damage, etc. on a road surface so that there is a high possibility that the abrupt up and down of luminance often indicates a region of the road surface reflection. Thus, since the calculator 23 calculates the second difference as the luminance change amount of the plural pixels, the preliminary determiner 24 can easily determine the adhered substance region or the region of the road surface reflection in a later process. More specifically, for example, the second difference is large in a region in which luminance of three continuous pixels abruptly ups and downs (change from "180" to "160" and then to "180" in FIG. 7) due to a small crack, a small damage, etc. of the road surface. In other words, the second difference is calculated so that the region in which the luminance abruptly ups and downs can be easily identified. Thus, the preliminary determiner 24 can easily determine the adhered substance region or the region of the road surface reflection in the later process.

The calculator 23 outputs the second difference that is a calculation result, as the luminance change amount of the plural pixels, to the preliminary determiner 24.

The calculator 23 uses the second difference as the luminance change amount of the plural pixels but the calculator 23 may use the first difference as the luminance change amount of the plural pixels. In a case where the first difference is used as the luminance change amount of the plural pixels, number of the plural pixels may be two or more. More specifically, in a case where the luminance change amount between two pixels is calculated, one calculated first difference may be used as the luminance change amount. In a case where the luminance change amounts among three or more pixels are calculated, an average value of the plural calculated first differences may be used as the luminance change amount.

The preliminary determiner 24 generates a histogram of the luminance change amounts of the plural pixels ("hereinafter referred also to as "pixel group") calculated by the calculator 23 to determine whether or not the candidate region 100 is the adhered substance region. Here, a determination process that is performed by the preliminary determiner 24 will be described with reference to FIG. 8.

Figure 8:
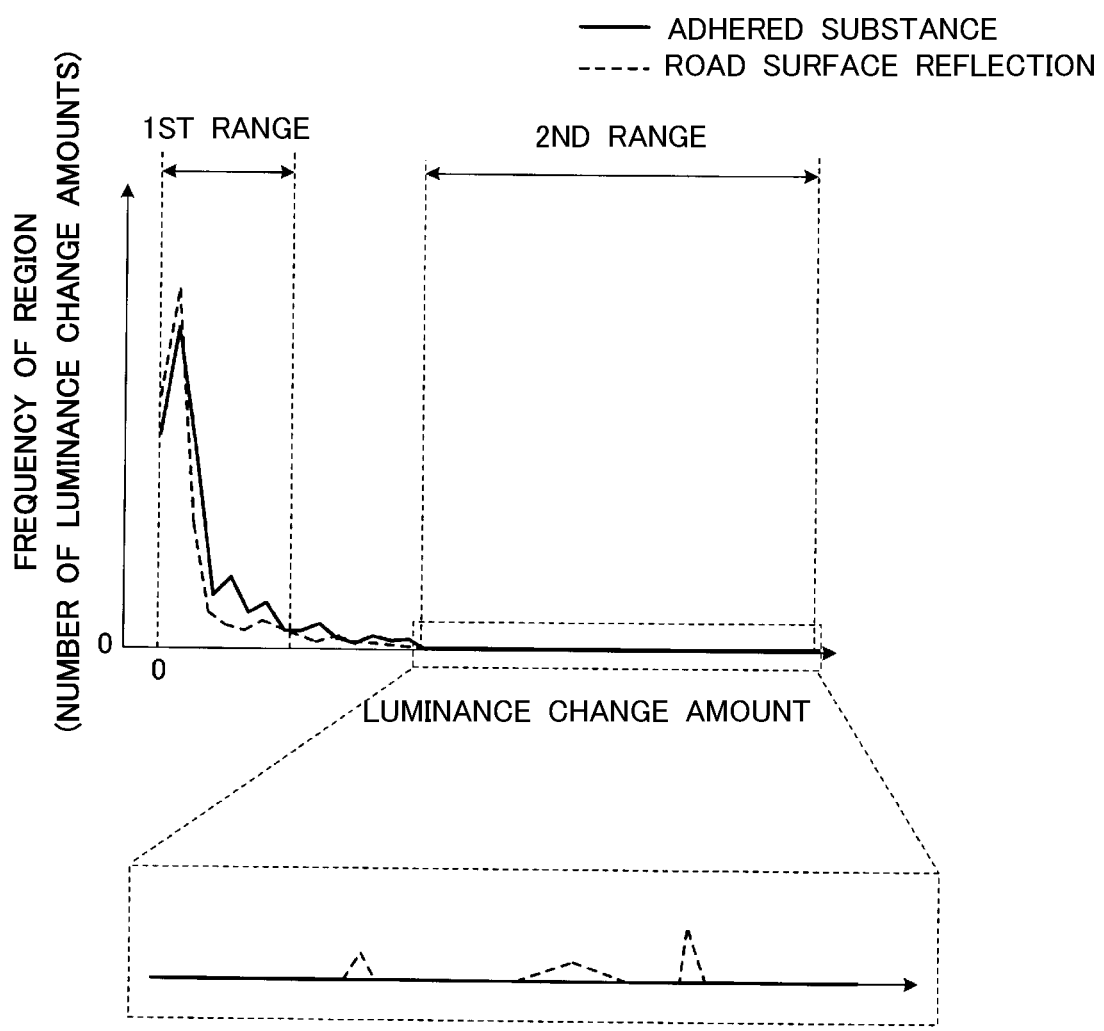
FIG. 8 illustrates a determination process that is performed by a preliminary determiner.

FIG. 8 illustrates the determination process that is performed by the preliminary determiner 24. FIG. 8 illustrates histograms showing luminance change amount for each of a plurality of the pixel groups in one inner region 200. In the histograms in FIG. 8, a horizontal axis represents the luminance change amount and a vertical axis represents frequency of region. Further, one of the histograms in FIG. 8 shows a case in which the candidate region 100 is the adhered substance region and the other shows a case in which the candidate region 100 is the region of the road surface reflection (region other than the adhered substance region).

Here, the frequency of region corresponds to number of the pixel groups, and one frequency corresponds to one pixel group. In other words, one frequency corresponds to one luminance change amount of one pixel group. Moreover, the frequency of region is normalized so that a sum of the frequencies is to be a predetermined value. In other words, even when sizes of the inner regions 200 vary, the sum of the frequencies of region is same (constant) in the histogram in FIG. 8.

As shown in FIG. 8, when the histogram of the adhered substance region is compared to the histogram of the region of the road surface reflection, the frequencies of region in both histograms are similar to each other in a first range. However, in a second range, a sum of frequencies of the region of the road surface reflection is slightly greater than the frequencies of the adhered substance region because a crack, a damage, a dirt, etc. on the road surface affects the frequencies in the second range.

Due to that point described above, the preliminary determiner 24 determines whether or not the candidate region 100 is the adhered substance region based on number of the luminance change amounts in the first range and number of the luminance change amounts in the second range in which the luminance change amounts are greater as compared to the first region.

More specifically, the preliminary determiner 24 determines whether or not the candidate region 100 is the adhered substance region based on i) the sum of the frequencies of region in the first range of which a minimum luminance change amount is "0 (zero)" and ii) the sum of the frequencies of region in the second range of which a minimum luminance change amount is greater than a maximum value of the first range.

For example, when the sum of the frequencies of region in the first range is equal to or greater than a predetermined value and also the sum of the frequencies of region in the second range is less than a predetermined value, the preliminary determiner 24 determines that the candidate region 100 is the adhered substance region.

On the other hand, when the sum of the frequencies of region in the first range is equal to or greater than the predetermined value and also the sum of the frequencies of region in the second range is equal to or greater than the predetermined value, the preliminary determiner 24 determines that the candidate region 100 is not the adhered substance region (the candidate region 100 is the region of the road surface reflection).

Thus, since the preliminary determiner 24 excludes, from the candidate region 100, a region corresponding to the region of the road surface reflection, it is possible to prevent an incorrect determination of the region of the road surface as the adhered substance region.

Further, when the sum of the frequencies of region in the first range is smaller than the predetermined value, the preliminary determiner 24 determines that the candidate region 100 is not the adhered substance region regardless of the sum of frequencies of region in the second range.

Then, the preliminary determiner 24 performs a continuity determination process that determines whether or not the candidate region 100 has been continuously determined as the adhered substance region. Here will be described the continuity determination process that is performed by the preliminary determiner 24.

Figure 9:
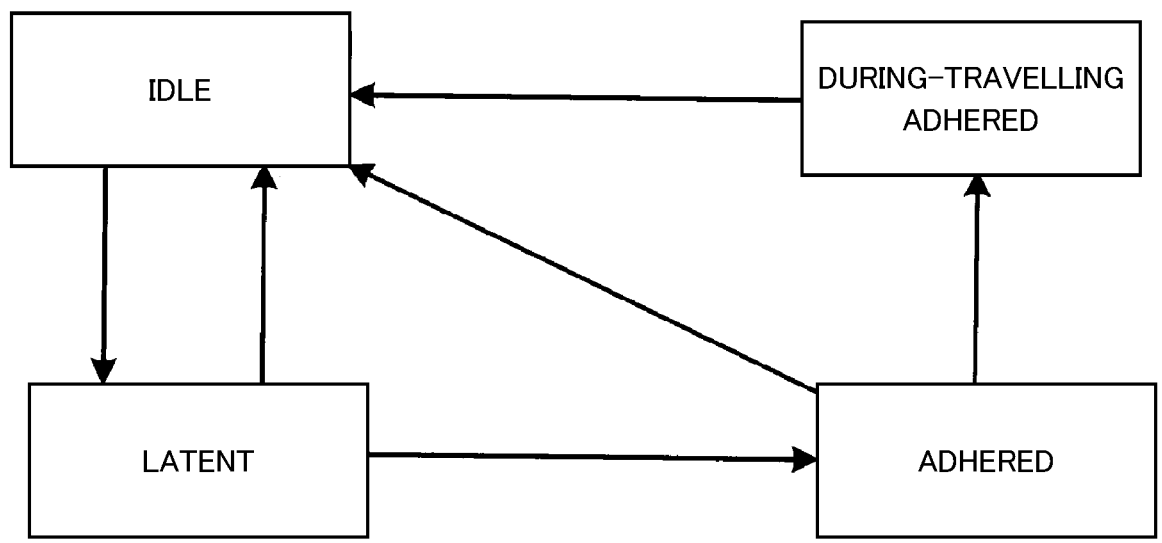
FIG. 9 illustrates a continuity determination process that is performed by the preliminary determiner.

FIG. 9 illustrates the continuity determination process that is performed by the preliminary determiner 24. FIG. 9 illustrates a state machine for managing a state of the candidate region 100, and shows a shift of a state relating to an adhered substance of the candidate region 100.

As shown in FIG. 9, the candidate region 100 can be in one of four states, "idle," "latent," "adhered," and "during-travelling adhered."

The "idle" state shows that the candidate region 100 is not determined to be the adhered substance region. In other words, the "idle" state shows that the candidate region 100 has not been the adhered substance region.

The "latent" state shows that a substance is possibly adhered. In other words, the "latent" state shows that the candidate region 100 was determined to be the adhered substance region but the candidate region 100 has been continuously determined to be the adhered substance region for a time period shorter than a predetermined time period.

The "adhered" state shows that a substance is adhered. In other words, the "adhered" state shows that the candidate region 100 has been continuously determined to be the adhered substance region for a time period equal to or greater than the predetermined time period.

The "during-travelling adhered" state shows that a substance has been continuously adhered even during travelling of the vehicle (a vehicle speed is equal to or greater than a predetermined value). In other words, the "during-travelling adhered" state shows that the candidate region 100 has been continuously determined to be the adhered substance region for a predetermined time period or greater during travelling of the vehicle. Hereinafter, the candidate region 100 (the adhered substance region) in the "during-travelling adhered" state is referred to also as "travelling adhered substance region."

The shift among the states will be described below. The shift among the states is determined based on a score that indicates continuity of determination as the adhered substance region.

<"Idle" State to "Latent" State>

For example, as to the candidate region 100 determined to be the adhered substance region for a first time, the preliminary determiner 24 shifts the state of the candidate region 100 from the "idle" state to the "latent" state.

<"Latent" State to "Idle" State>

For example, as to the candidate region 100 continuously determined to be the adhered substance region for a time period shorter than the predetermined time period, once determining, based on the current captured image I, that the candidate region 100 is not the adhered substance region, the preliminary determiner 24 shifts the state of the candidate region 100 from the "latent" state to the "idle" state.

<"Latent" State to "Adhered" State>

For example, once a time period for which the candidate region 100 has been continuously determined to be the adhered substance region reaches the predetermined time period, the preliminary determiner 24 shifts the state of the candidate region 100 from the "latent" state to the "adhered" state. Once shifting the state of the candidate region 100 from the "latent" state to the "adhered" state, the preliminary determiner 24 outputs, to the flag output part 26, information of the adhered substance region associated with the "adhered" state.

<"Adhered" State to "Idle" State>

For example, as to the candidate region 100 continuously determined to be the adhered substance region for a time period equal to or greater than the predetermined time period, once determining, based on the current captured image I, that the candidate region 100 is not the adhered substance region, the preliminary determiner 24 shifts the state of the candidate region 100 from the "adhered" state to the "idle" state.

<"Adhered" State to "During-Travelling Adhered" State>

For example, as to the candidate region 100 of which the state was shifted to the "adhered" state, once a time period for which the candidate region 100 has been continuously determined to be the adhered substance region reaches the predetermined time period even during travelling of the vehicle, the preliminary determiner 24 shifts the state of the candidate region 100 from the "adhered" state to the "during-travelling adhered" state. Once shifting the state of the candidate region 100 from the "adhered" state to the "during-travelling adhered" state, the preliminary determiner 24 outputs, to the flag output part 26, information of the adhered substance region (the travelling adhered substance region) associated with the "during-travelling adhered" state.

<"During-Travelling Adhered" State to "Idle" State>

For example, as to the candidate region 100 in the "during-travelling adhered" state, once determining, based on the current captured image I captured while the vehicle is travelling, that the candidate region 100 is not the adhered substance region, the preliminary determiner 24 shifts the state of the candidate region 100 from the "during-travelling adhered" state to the "idle" state.

The final determiner 25 finally determines the adhered substance region, based on i) an area of the candidate region 100 extracted by the extractor 22 in the first region including the road surface region 510 in the captured image I and ii) an area of the candidate region 100 extracted by the extractor 22 in the second region including the region 520 other than the road surface region 510 in the captured image I.

For example, the final determiner 25 finally determines the adhered substance region based on an area of the candidate region 100 determined by the preliminary determiner 24 to be the adhered substance region (the "adhered" state and the "during-travelling adhered" state).

Here, a final determination process that is performed by the final determiner 25 will be described with reference to FIG. 10.

Figure 10:
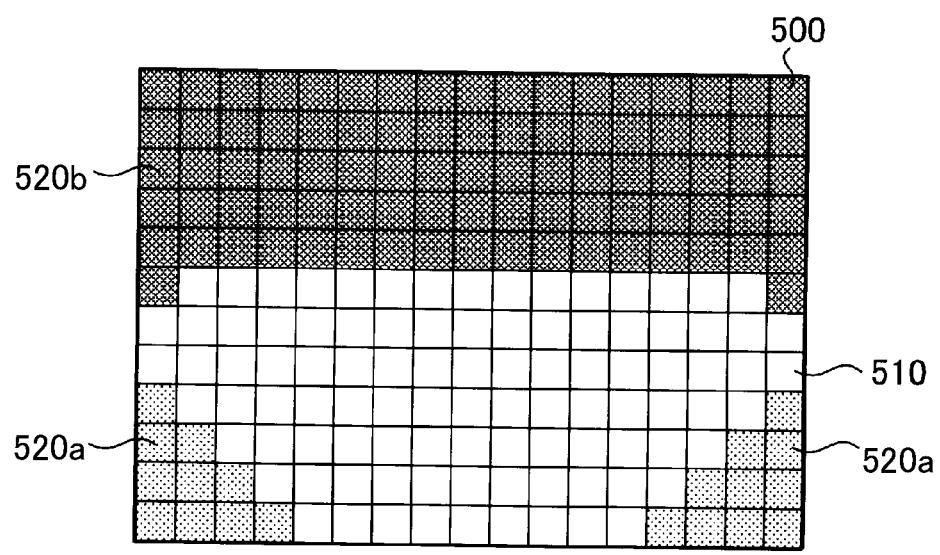
FIG. 10 illustrates a final determination process that is performed by a final determiner.

FIG. 10 illustrates the final determination process that is performed by the final determiner 25. As shown in FIG. 10, the final determiner 25 first divides an entire region of the captured image I into predetermined small regions 500, and groups the predetermined small regions 500 into three regions 510, 520a and 520b.

In other words, the final determiner 25 divides the entire region of the captured image I into the road surface region 510, a vehicle region 520a, and a sky region 520b. In this embodiment, the first region is the road surface region 510 and the second region is the vehicle region 520a and the sky region 520b.

For example, the final determiner 25 detects a horizontal line in the captured image I and sets an upper region above the horizontal line as the sky region 520b. Further, the vehicle region 520a is predetermined according to a position of the camera 10 mounted on the vehicle. The final determiner 25 sets, as the road surface region 510, a region other than the vehicle region 520a and the sky region 520b in the entire region of the captured image I Then, the final determiner 25 converts the candidate region 100 determined by the preliminary determiner 24 to be the adhered substance region, into the small regions 500, and calculates an area ratio of an area of the adhered substance region (the small region 500) of each of the three regions 510, 520a, and 520b. For example, the final determiner 25 calculates the area ratio of the area of the adhered substance region in each of the three regions 510, 520a, and 520b, to an area of the entire adhered substance region deemed as 1 (100%).

Then, when an area ratio between the area of the adhered substance region (the candidate region 100) located in the first region (the road surface region 510) and the area of the adhered substance region located in the second region (the vehicle region 520a and the sky region 520b), satisfies a predetermined road surface abnormality condition, the final determiner 25 finally determines the adhered substance region other than the adhered substance region in the road surface region 510, to be the adhered substance region.

For example, when the area of the adhered substance region located in the first region is greater than the area of the adhered substance region located in the second region by at least a predetermined value, the final determiner 25 finally determines the adhered substance region other than the adhered substance region located in the first region, to be the adhered substance region.

In another case, when, among the region 510, 520a, and 520b, the area ratio of the road surface region 510 is greater than the each of the area ratios of the vehicle region 520a and the sky region 520b by at least a predetermined value, the final determiner 25 determines the adhered substance region in the vehicle region 520a and the sky region 520b, to be the final adhered substance region.

Meanwhile, when the area ratios of the road surface region 510, the vehicle region 520a, and the sky region 520b are approximately same (differences among the area ratios of the regions 510, 520a, and 520b are smaller than a predetermined value), the final determiner 25 determines a sum of the areas of the adhered substance regions in the three regions 510, 520a and 520b, to be a calculation result of the area calculation process.

This is because in a case of an adhered substance such as a raindrop, the adhered substances often evenly appear in the entire captured image I. On the other hand, the region of the road surface reflection is often concentrated in the road surface region in the captured image I.

In other words, when the adhered substance region is concentrated in the road surface region 510, the final determiner 25 determines that the adhered substance region is the region of the road surface reflection, and determines the final adhered substance region by subtracting the area of the adhered substance region in the road surface region 510 from the entire adhered substance region.

As described above, the final determiner 25 determines whether or not the adhered substance region is the region of the road surface reflection based on whether or not the adhered substance region is concentrated in the road surface region 510. Thus, the adhered substance region can be accurately determined.

The final determiner 25 compares the area of the first region to the area of the second region. However, comparison is not limited thereto. The comparison may be between the first region (or the second region) and the entire adhered substance region, or between the road surface region 510 and the vehicle region 520*a* (or the sky region 520*b*), or the like.

When the adhered substance region is concentrated in the road surface region 510 but the adhered substance region is the travelling adhered substance region, the final determiner 25 does not subtract the adhered substance region in the road surface region 510 from the entire adhered substance region.

This is to detect a small travelling adhered substance region that has a high probability of the adhered substance region as the determination result. In other words, when the travelling adhered substance region is concentrated in the road surface region 510, the final determiner 25 determines the travelling adhered substance region to be the adhered substance region, not to be the region of the road surface reflection.

Then, the final determiner 25 outputs the information of the finally determined adhered substance region, to the flag output part 26.

When the area of the adhered substance region finally determined by the final determiner 25 is equal to or greater than a predetermined value, the flag output part 26 outputs an adhered substance flag indicative of ON to the various devices 50. When the area of the adhered substance region finally determined by the final determiner 25 is smaller than the predetermined value, the flag output part 26 outputs an adhered substance flag indicative of OFF to the various devices 50.

More specifically, in a case where the adhered substance region finally determined by the final determiner 25 is the travelling adhered substance region, when the area of the travelling adhered substance region is equal to or greater than a first threshold, the flag output part 26 outputs the adhered substance flag indicative of ON, and when the area of the travelling adhered substance region is smaller than the first threshold, the flag output part 26 outputs the adhered substance flag indicative of OFF.

When the area of the adhered substance region (in the "adhered" state and the "during-travelling adhered" state) is equal to or greater than a second threshold that is greater than the first threshold, the flag output part 26 outputs the adhered substance flag indicative of ON, and when the area of the adhered substance region is smaller than the second threshold, the flag output part 26 outputs the adhered substance flag indicative of OFF.

As described above, in the case of the travelling adhered substance region, the first threshold smaller than the second threshold is set. Thus, the flag output part 26 can accurately detect the small travelling adhered substance region that has a high probability of the adhered substance region as the determination result.

Figure 11:
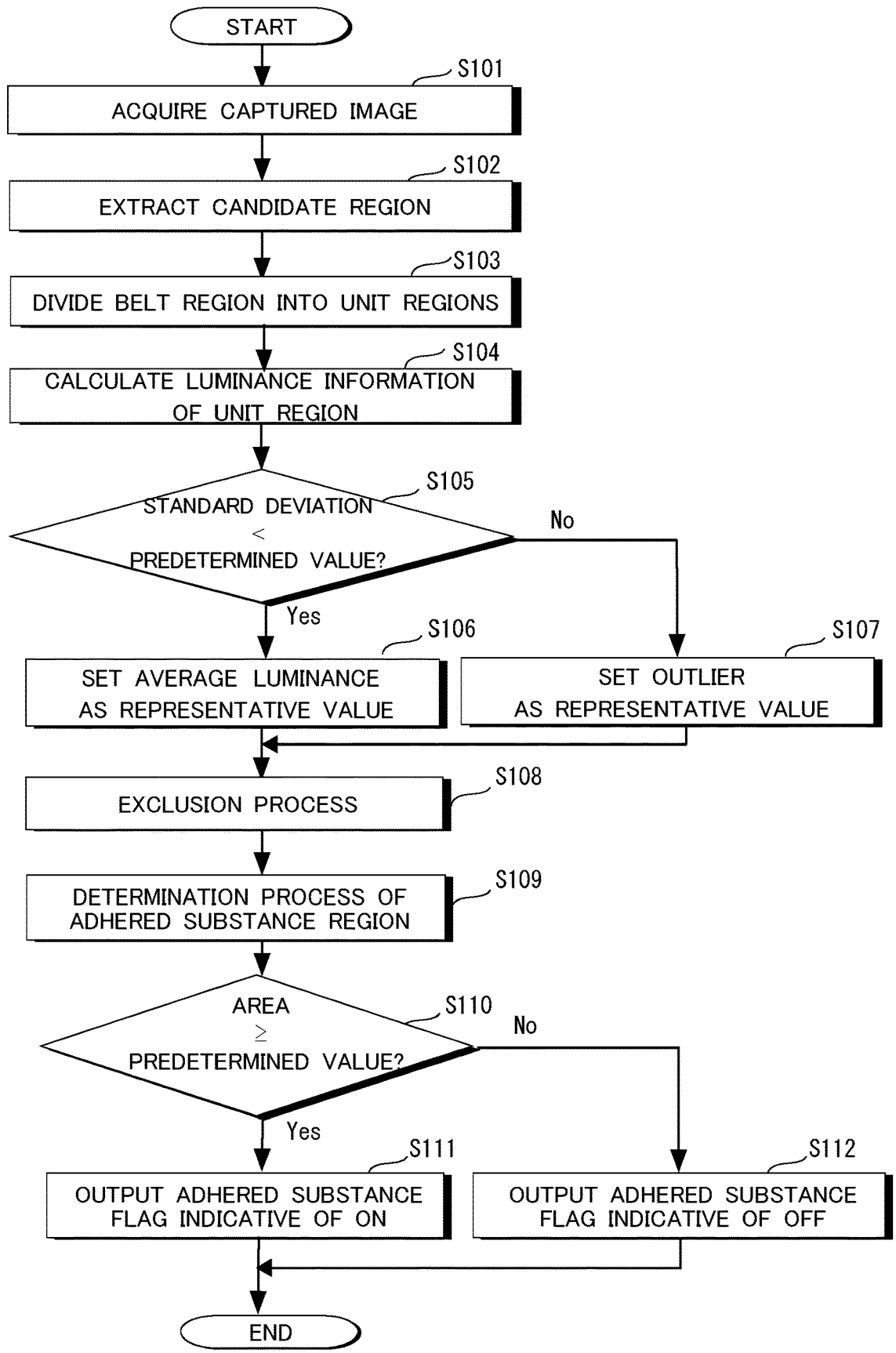
FIG. 11 is a flowchart showing a procedure of the entire adhered substance detection that is performed by the adhered substance detection apparatus of the embodiment.

Next will be described, with reference to FIG. 11, a procedure of the entire process that is performed by the adhered substance detection apparatus 1 of this embodiment. FIG. 11 is a flowchart showing the procedure of the entire adhered substance detection that is performed by the adhered substance detection apparatus 1 of this embodiment.

As shown in FIG. 11, the image acquisition part 21 first acquires the captured image I captured by the camera 10. After performing the grayscale processing and thinning process of the acquired captured image I, the image acquisition part 21 acquires, as the captured image I, an integral image generated based on the values of pixels in the reduced-sized captured image I (a step S101).

Next, the extractor 22 extracts, based on the edge detected from each pixel in the captured image I acquired by the image acquisition part 21, the candidate region 100 for being the adhered substance region in which a substance is adhered to the camera 10 (a step S102).

Next, the extractor 22 divides the belt region 110 including the plurality of continuous pixel lines in the extracted candidate region 100 into the unit regions R by a predetermined number of the pixels (a step S103).

Then, the extractor 22 first calculates the luminance information for each of the unit regions R (a step S104). The luminance information is, for example, an average luminance value and a luminance standard deviation.

Then, the extractor 22 determines whether or not the calculated luminance standard deviation is smaller than the predetermined value (a step S105).

When the luminance standard deviation is smaller than the predetermined value (Yes in the step 105), the extractor 22 sets the average luminance value (luminance average) as the representative value of the unit region R (a step S106).

When the luminance standard deviation is equal to or greater than the predetermined value (No in the step S105), the extractor 22 sets the outlier as the representative value of the unit region R (a step S107).

Next, when the average luminance distribution of the unit region R in the candidate region 100 satisfies the predetermined exclusion condition, the extractor 22 performs the exclusion process that excludes the candidate region 100 from the adhered substance region determination process (a step S108).

Next, the extractor 22 extracts the candidate region 100 in which the fluctuation of the average luminance distribution of the unit region R satisfies the predetermined fluctuation pattern, and the preliminary determiner 24 performs the determination process that determines whether or not the candidate region 100 is the adhered substance region, based on the calculation result of the calculator 23 (a step S109).

Next, the final determiner 25 performs the final determination process based on the area of the candidate region 100 continuously determined to be the adhered substance region by the preliminary determiner 24. Then, the flag output part 26 determines whether or not the area of the finally determined adhered substance region is equal to or greater than the predetermined value (a step S110).

When the area of the finally determined adhered substance region is equal to or greater than the predetermined value (Yes in the step S110), the flag output part 26 outputs the adhered substance flag indicative of ON to the various devices 50 (a step S111), and ends the process.

When the area of the finally determined adhered substance region is smaller than the predetermined value (No in the step S110), the flag output part 26 outputs the adhered substance flag indicative of OFF to the various devices 50 (a step S112), and ends the process.

Figure 12:
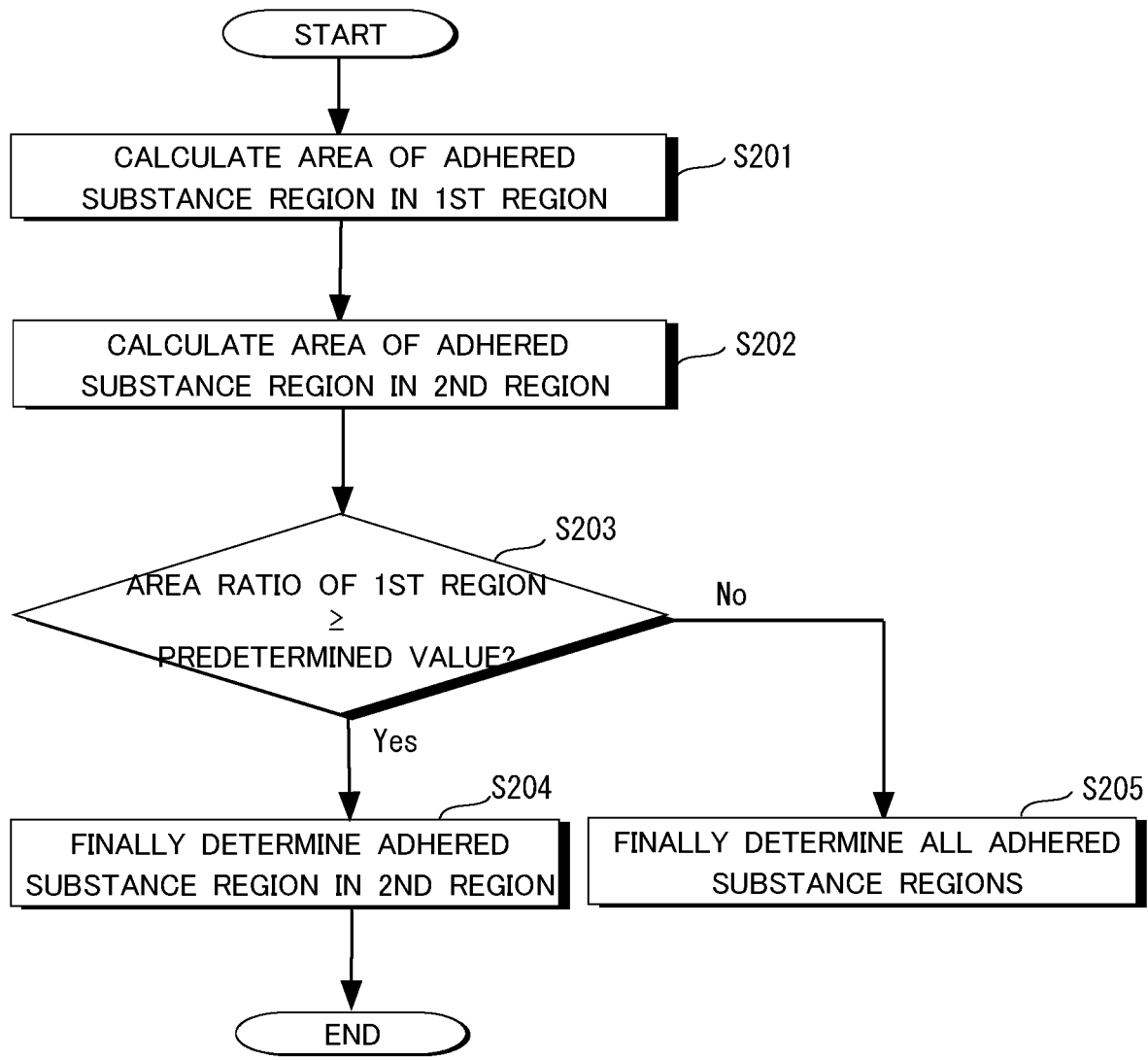
FIG. 12 is a flowchart showing a procedure of the final determination process that is performed by the adhered substance detection apparatus of this embodiment.

Next will be described below with reference to FIG. 12 a procedure of the final determination process that is performed by the adhered substance detection apparatus 1 of this embodiment. FIG. 12 is a flowchart showing the procedure of the final determination process that is performed by the adhered substance detection apparatus 1 of this embodiment.

As shown in FIG. 12, the final determiner 25 first calculates the area of the adhered substance region located in the first region including the road surface region 510 (a step S201).

Next, the final determiner 25 calculates the area of the adhered substance region located in the second region including the region 520 other than the road surface region 510 (a step S202).

Next, when, among the first and second regions, the area ratio of the first region is equal to or greater than the predetermined value (Yes in a step S203), the final determiner 25 finally determines the adhered substance region located in the second region other than the adhered substance region located in the first region, to be the adhered substance region (a step S204). Then, the final determiner 25 ends the process.

On the other hand, when the area ratio of the first region is smaller than the predetermined value (No in the step S203), the final determiner 25 finally determines all adhered substance regions located in the first and second regions, to be the adhered substance region (a step S205). Then, the final determiner 25 ends the process.

As described above, the adhered substance detection apparatus 1 of this embodiment includes the extractor 22 and the final determiner 25. The extractor 22 extracts, based on the edge detected from each pixel in the captured image I captured by an image-capturing apparatus (the camera 10), the candidate region 100 for being the adhered substance region in which a substance is adhered to the image-capturing apparatus. The final determiner 25 finally determines the adhered substance region based on i) an area of the candidate region 100 extracted by the extractor 22 in the first region including the road surface region 510 and ii) an area of the candidate region 100 extracted by the extractor 22 in the second region including the regions 520a and 520b other than the road surface region 510. Thus, an adhered substance can be accurately detected.

The foregoing embodiment uses the captured image I that is captured by a camera mounted on a vehicle. However, the captured image I may be an image captured by a security camera, a camera installed on a streetlight, etc. In other words, the captured image I may be an image captured by a camera having a lens on which a substance may be adhered.

While the invention has been shown and described in detail, the foregoing description is in all aspects illustrative and not restrictive. It is therefore understood that more numerous effects and modifications can be easily derived by a person skilled in art. Thus, a broader mode of the invention is not limited to the forgoing description and the foregoing typical embodiment. Thus, various modifications can be possible without departing from the comprehensive spirit or range of the invention defined by the attached claims and equivalent thereof.

What is claimed is:

1. An adhered substance detection apparatus that determines whether a substance is adhered to an image-capturing apparatus, the adhered substance detection apparatus comprising a controller configured to function as:
   an extractor that extracts candidate regions for being an adhered substance region in which the substance is adhered to the image-capturing apparatus, the candidate regions being extracted based on an edge that is detected from pixels in a captured image captured by the image-capturing apparatus; and
   a final determiner that finally determines whether the candidate regions are the adhered substance region, based on, among the candidate regions extracted by the extractor, i) an area of the candidate regions located in a first region of the captured image, the first region including a road surface region in the captured image and ii) an area of the candidate regions located in a second region of the captured image, the second region including a region other than the road surface region in the captured image.

2. The adhered substance detection apparatus according to claim 1, wherein
   when an area ratio between the area of the candidate regions in the first region and the area of the candidate regions in the second region satisfies a predetermined road surface abnormality condition, the final determiner finally determines the candidate region other than the candidate regions in the road surface region, to be the adhered substance region.

3. The adhered substance detection apparatus according to claim 1, wherein
   when the area of the candidate regions in the first region is greater than the area of the candidate regions in the second region by at least a predetermined value, the final determiner finally determines the candidate regions other than the candidate regions in the first region, to be the adhered substance region, the first region being the road surface region, and the second region being a vehicle region and a sky region.

4. An adhered substance detection method that determines whether a substance is adhered to an image-capturing apparatus, the adhered substance detection method comprising the steps of:
   extracting, by a controller, candidate regions for being an adhered substance region in which the substance is adhered to the image-capturing apparatus, the candidate regions being extracted based on an edge that is detected from pixels in a captured image captured by the image-capturing apparatus; and
   finally determining, by the controller, whether the candidate regions are the adhered substance region, based on, among the candidate regions extracted by the extracting step, i) an area of the candidate regions located in a first region of the captured image, the first region including a road surface region in the captured image and ii) an area of the candidate regions located in a second region of the captured image, the second region including a region other than the road surface region in the captured image.

5. The adhered substance detection method according to claim 4, wherein
   when an area ratio between the area of the candidate regions in the first region and the area of the candidate regions in the second region satisfies a predetermined road surface abnormality condition, the final determining step finally determines the candidate regions other than the candidate regions in the road surface region, to be the adhered substance region.

6. The adhered substance detection method according to claim 4, wherein
   when the area of the candidate regions in the first region is greater than the area of the candidate regions in the second region by at least a predetermined value, the final determining step finally determines the candidate regions other than the candidate regions in the first region, to be the adhered substance region, the first region being the road surface region, and the second region being a vehicle region and a sky region.

* * * * *